No. 758,208. PATENTED APR. 26, 1904.
J. B. HARIG.
ANIMAL TRAP.
APPLICATION FILED FEB. 26, 1903. RENEWED MAR. 17, 1904.
NO MODEL. 2 SHEETS—SHEET 2.
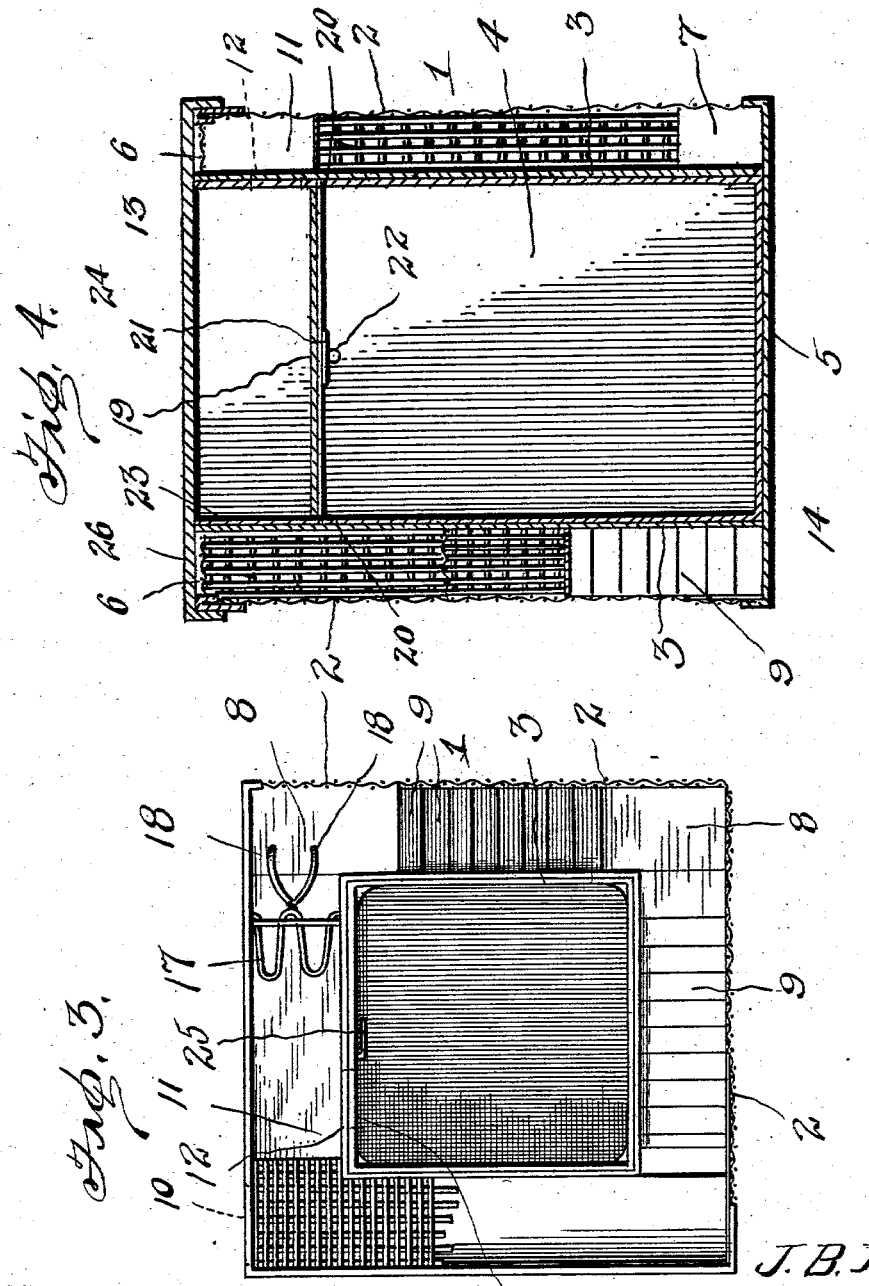

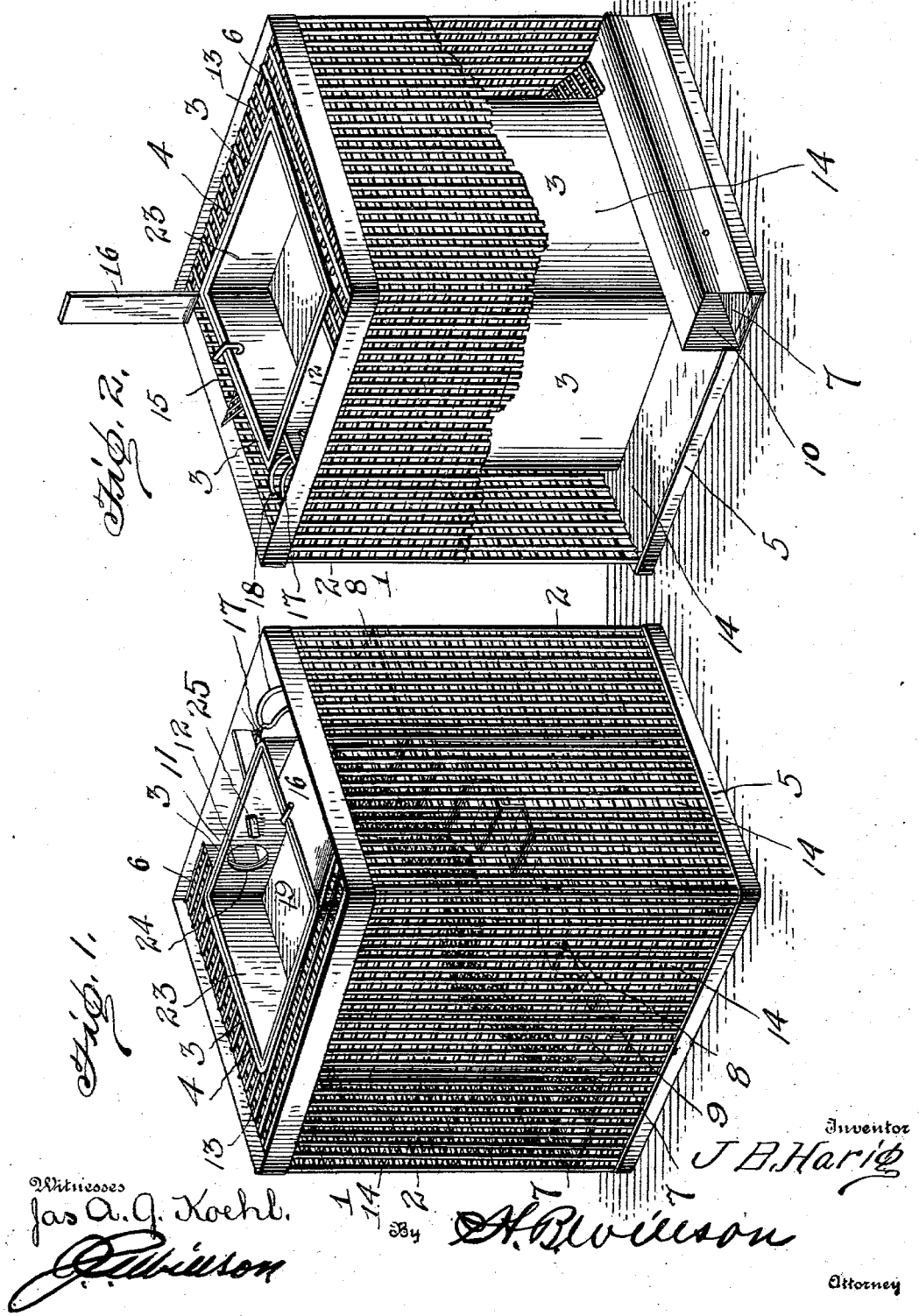

No. 758,208. Patented April 26, 1904.

UNITED STATES PATENT OFFICE.

JOSEPH BERNARD HARIG, OF BALTIMORE, MARYLAND.

ANIMAL-TRAP.

SPECIFICATION forming part of Letters Patent No. 758,208, dated April 26, 1904.

Application filed February 26, 1903. Renewed March 17, 1904. Serial No. 198,607. (No model.)

*To all whom it may concern:*

Be it known that I, JOSEPH BERNARD HARIG, a citizen of the United States, residing at Baltimore, in the State of Maryland, have invented certain new and useful Improvements in Animal-Traps; and I do declare the following to be a full, clear, and exact description of the invention, such as will enable others skilled in the art to which it appertains to make and use the same.

My invention is an improved trap adapted for catching mice and rats and also adapted for trapping other animals; and it consists in the peculiar construction and combination of devices hereinafter described and claimed.

The object of my invention is to provide a novel device of this character in which the bait, such as grain, may remain permanently and in which the bait, while serving as a lure to entice the animals into entering the trap, is inaccessible to the animals under all conditions, so that the trap requires but one baiting, a further object of the invention being to effect improvements in the construction of the device, whereby the trap containing the captured animal or animals may be removed from the vessel which contains the bait and the runway which leads to the trap.

In the accompanying drawings, Figure 1 is a perspective view of a trap constructed in accordance with my improvements. Fig. 2 is a similar view showing the opposite side thereof. Fig. 3 is partly a top plan view and partly a section of the same. Fig. 4 is a vertical sectional view of the same.

In the embodiment of my invention here shown I provide an outer vessel 1, which may be of any suitable size, shape, and construction. The exterior walls 2 of this vessel are preferably formed of wire-screen material, and the interior walls 3 thereof, which form an interior receptacle 4, are preferably made of sheet metal, the bottom 5 being also preferably made of sheet metal and the top 6 being preferably made of wire-screen material. Between the exterior and interior walls of the outer vessel is formed a runway 7, which extends around the inner walls and ascends the same, said runway preferably including horizontal landings 8 and inclined step-flights 9, the entrance 10 to the runway being at the lower side of the said outer vessel and the terminus 11 thereof being near the upper side of the outer vessel. An opening 12 in one side of the inner compartment establishes communication between the latter and the terminus of the runway. The latter is covered throughout its length, as at 13, preferably with wire-screen material, either in whole or in part, and thereby the runway, although it extends through and winds around the outer vessel, does not communicate with the receptacle 14, formed by the space above and below the said runway, which receptacle 14 is adapted to be filled with grain or other suitable material to serve as a bait. The bait-receptacle has an opening 15 at its upper side and a hinged closure 16 therefor to enable grain to be poured into said bait-receptacle to fill the same. When the outer walls of the outer vessel are, as in the present instance, made of wire-screen material, the bait will be plainly visible from the exterior of the outer vessel, and the latter will present merely the appearance of a box filled with grain.

In the upper landing of the runway, near the terminus thereof, is a hinge gravity-gate 17, which enables rats and mice to readily pass under it, but prevents them from returning. The said gate is provided with rearwardly-extending arms 18, which lower behind the animal as it raises the gate to prevent it from backing from under the gate after having started to raise the same.

In the inner receptacle of the outer vessel is a suitable trap. The same may, within the scope of my invention, be of any suitable construction, and I do not desire to limit myself in this particular. It is here shown as a platform 19, hinged at opposite sides, as at 20, adapted to open downwardly in one direction, weighted, as at 21, to restore it to a horizontal position by gravity after having been thus downwardly opened, a stop 22 being provided to normally support the platform in a horizontal position. Preferably this trap-platform is carried and mounted in a vessel 23, which fits snugly in the interior compartment of the outer vessel and is removable therefrom upwardly and is preferably made of sheet metal. The said removable trap vessel has an opening 24 in one side immediately above the trap-platform and which registers with the opening at the inner end of the runway, so that the animal may readily enter said trap vessel above the trap-platform from the runway. Said trap vessel also has a stop 25 to limit the movement of the trap-platform when the latter is tilted by the weight of the animal to cause the animals to drop into the trap vessel.

It will be understood from the foregoing description that immediately after the animal is thus dropped into the trap vessel the trap-platform reassumes its normal horizontal position, effectually retaining the animal in the trap and resetting itself for another victim. By making the trap vessel removable from the outer vessel the animals may be readily gotten rid of. The entire trap, both the outer vessel and the inner trap vessel, is covered by a cover 26, which is removable therefrom and is preferably made of sheet metal.

From the foregoing description, taken in connection with the accompanying drawings, the construction and operation of the invenwill be readily understood without requiring a more extended explanation.

Various changes in the form, proportion, and the minor details of construction may be resorted to without departing from the principles or sacrificing any of the advantages of this invention.

Having thus fully described my invention, what I claim as new, and desire to secure by Letters Patent, is—

1. In a device of the class described, an outer vessel having a runway and a lure device inaccessible therefrom, and a trap within and removable from the outer vessel, and to which the runway leads, substantially as described.

2. In a device of the class described, an outer vessel having a runway and a bait-receptacle, and a trap within the latter to which the runway leads, substantially as described.

3. In a device of the class described, an outer vessel having a runway, a bait-receptacle, a compartment within the latter, and a trap in said compartment to which the runway leads, substantially as described.

4. In a device of the class described, an outer vessel having a runway, a bait-receptacle, a compartment within the latter to which the runway leads, and a trap in and removable from said compartment, substantially as described.

5. In a device of the class described, an outer vessel having a runway and forming a bait-receptacle through which the runway extends, and a compartment within the outer vessel to which the runway leads, substantially as described.

6. In a device of the class described, an outer vessel having a runway and forming a bait-receptacle through which the runway extends, a compartment within the outer vessel to which the runway leads, and a trap in and removable from said compartment, substantially as described.

7. A trap having a runway, and a pivoted gravitating inclined gate, the latter having a rearwardly-extending device to close behind the animal while the gate is being raised thereby, substantially as described.

In testimony whereof I have hereunto set my hand in presence of two subscribing witnesses.

JOSEPH BERNARD HARIG.

Witnesses:
   SYLVESTER G. STAYLOR,
   ALONZO A. STAYLOR.